Oct. 17, 1933.   E. S. STEPHENS   1,930,629
DEVICE FOR TESTING THE CONSISTENCY OF LIQUIDS
Original Filed May 13, 1926   5 Sheets-Sheet 1

Inventor
Elton S. Stephens

Oct. 17, 1933.    E. S. STEPHENS    1,930,629
DEVICE FOR TESTING THE CONSISTENCY OF LIQUIDS
Original Filed May 13, 1926    5 Sheets-Sheet 2

Inventor
Elton S. Stephens

Oct. 17, 1933.  E. S. STEPHENS  1,930,629
DEVICE FOR TESTING THE CONSISTENCY OF LIQUIDS
Original Filed May 13, 1926   5 Sheets-Sheet 4

Inventor
Elton S. Stephens

Oct. 17, 1933.  E. S. STEPHENS  1,930,629
DEVICE FOR TESTING THE CONSISTENCY OF LIQUIDS
Original Filed May 13, 1926   5 Sheets-Sheet 5

Inventor
Elton S. Stephens
by Chuning & Chuning
Attys

Patented Oct. 17, 1933

1,930,629

UNITED STATES PATENT OFFICE 1,930,629

DEVICE FOR TESTING THE CONSISTENCY OF LIQUIDS

Elton S. Stephens, Chicago, Ill., assignor, by mesne assignments, to Consistometer Corporation, a corporation of Illinois Application May 13, 1926, Serial No. 108,725
Renewed December 3, 1928

5 Claims. (Cl. 265—11)

This invention is designed primarily for the purpose of testing the lubricating value of lubricating oils at varying temperatures, and recording the results of such tests on a chart in such a way as to make a permanent record of the same.

The device is designed to utilize the varying friction of oils or other liquids at different temperatures as a means for transmitting motion from a constantly rotating element to a spring backed element, which latter will be responsive to the frictional action in varying degree depending upon the temperature, so that by recording the movements of the spring backed element by varying temperatures, a record line or curve indicating the consistency or lubricating value of the liquid at varying temperatures within the range of the instrument can be obtained for a comparison with a standard curve of such liquid or liquids.

Further objects and details of the invention will appear from a description thereof in connection with the accompanying drawings wherein—

Figure 1:
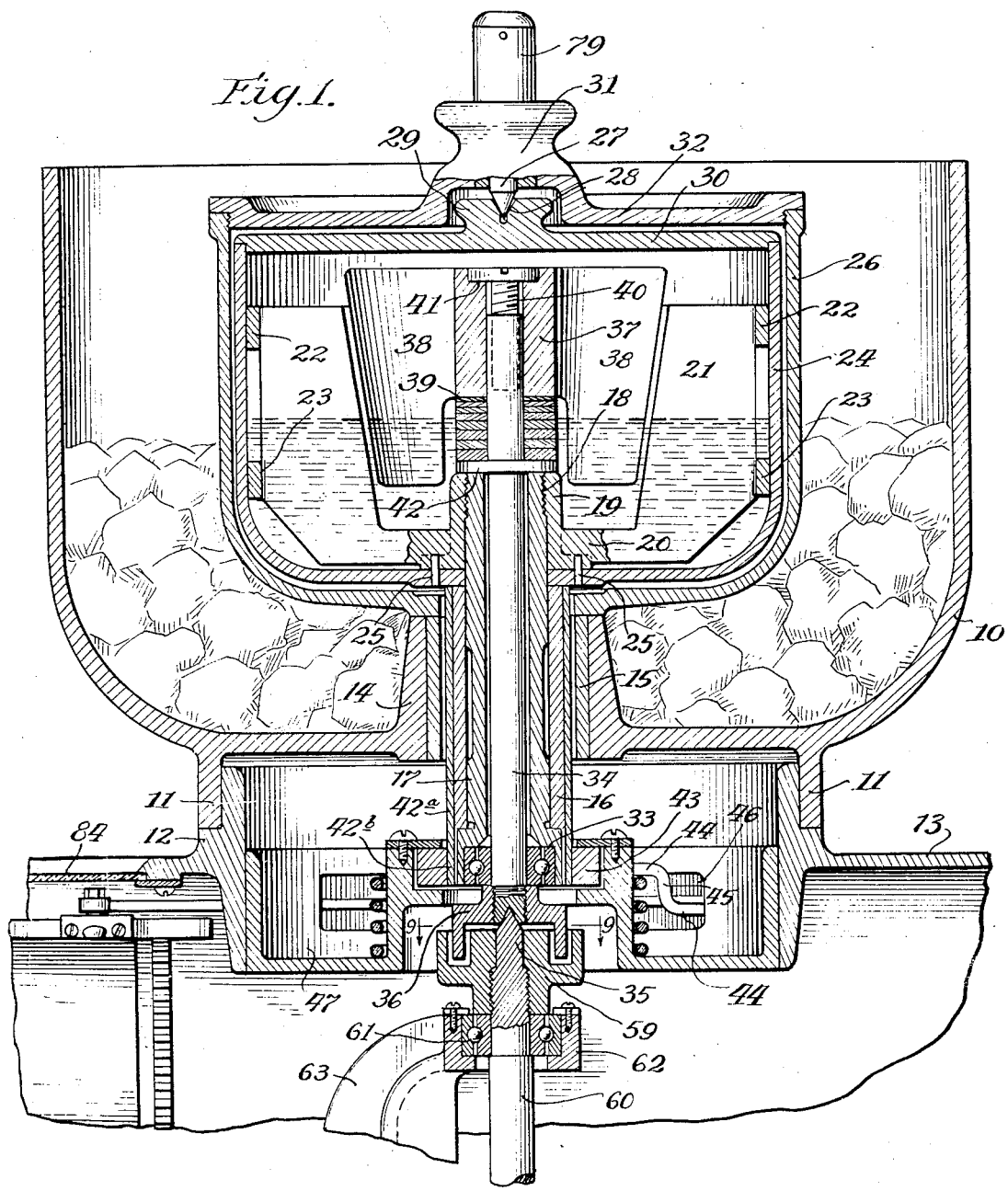
Figure 1 is a sectional elevation of the device in its preferred form.
Figure 9:
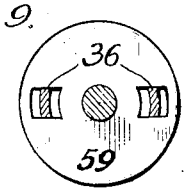
Fig. 9 is a detail taken on line 9—9 of Fig. 1.

The testing device comprises an outer bowl 10 adapted to contain crushed ice or other freezing medium employed for the purpose of progressively lowering the temperature of the oil or other liquid under test. The bowl is provided around its base with a flange 11 which is seated upon a shouldered neck 12 upstanding from a box 13 which houses the driving and recording mechanisms presently to be described.

The bowl is provided in its center with a bored boss 14, which is provided with a tubular lining 15 through which extends a sleeve 16 which surrounds and frictionally engages a bored stem 17 provided with a threaded upper end 18, which has threaded thereon a hub 19 provided at its base with radially extending arms 20, each of which arms terminates in an upstanding fin 21. The fins are united around their peripheries by integrally formed upper and lower connecting rings 22 and 23 respectively, which unite the fins into a cagelike structure, which is housed within and rigidly united with an inner cup 24, which is provided at its base with a plurality of dowel pins 25 which are entered into the base of the hub 19, so that the inner cup with the fin cage constitutes a rigid unit in the operation of the device.

The inner cup is surrounded by an outer cup 26 of similar configuration which is slightly spaced away from the inner cup to permit rotation of the latter without frictional engagement with the outer cup, and in order to accurately center the inner cup and permit limited rotation thereof, an upper cone bearing 27 is provided, the point of which seats within a bearing recess 28 in a boss 29 centrally disposed upon a cover plate 30, which fits closely upon the upper rim of the inner cup and serves as a closure for the same.

Figure 2:
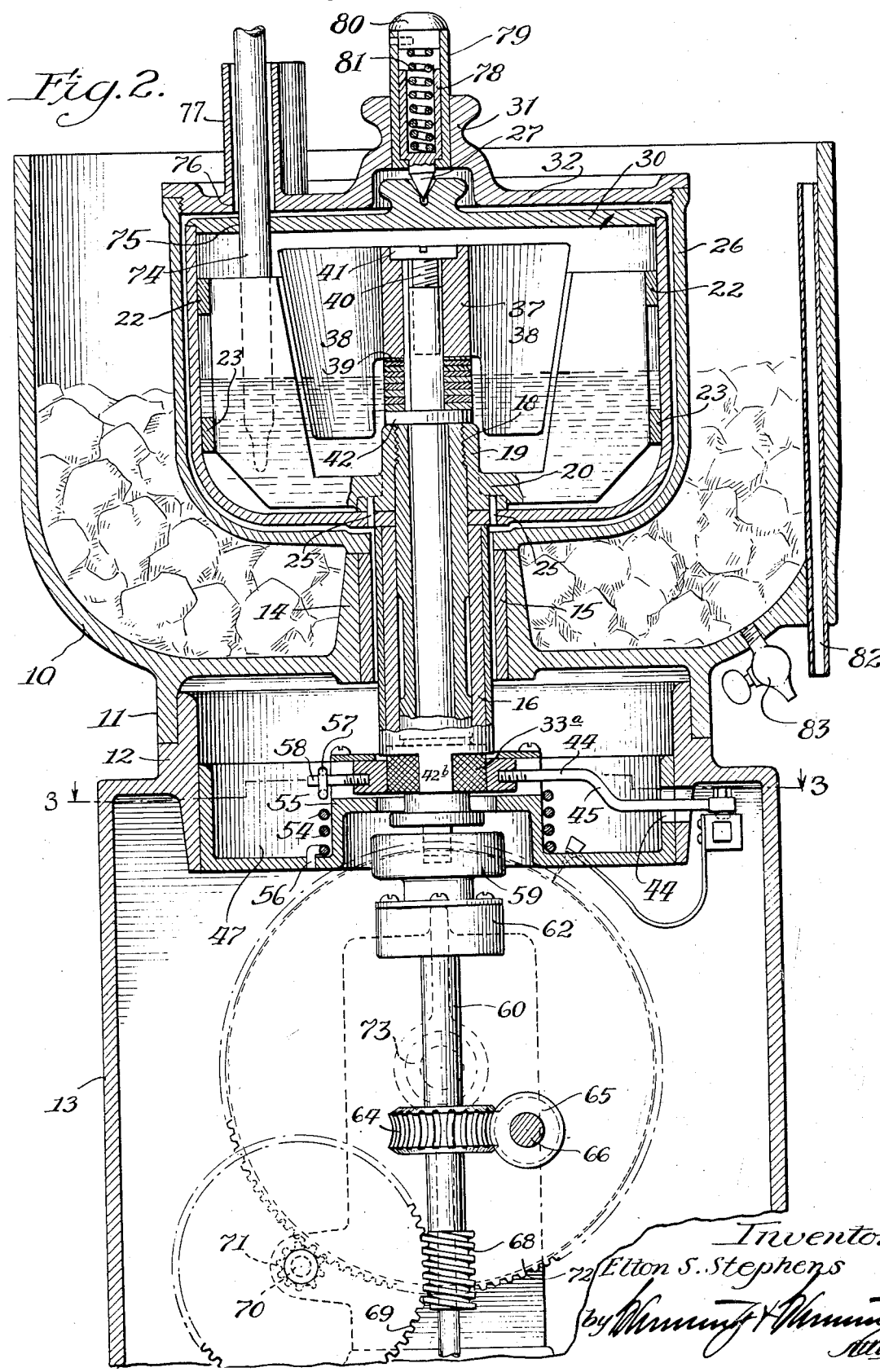
Fig. 2 is a sectional elevation taken at right angles to that of Fig. 1.

The cone bearing 27 is entered through a boss 31 in a cover plate 32, which is threaded upon the margin of the outer cup 26. The upper cone bearing 27 co-operates with ball bearings 33, housed in a recess in the lower end of the stem 17 which, as shown in Fig. 2, is provided with knurling 33$^a$ on its exterior to permit the turning of the stem for threading the same into the hub 19. The stem 17, being rigid with the inner cup, serves in conjunction with said ball bearings to center the same and permit free rotation thereof.

The bored stem 17 has entered therethrough a vertical shaft 34 which is also entered through the ball bearings 33, and said shaft rests upon a conical thrust bearing 35, and the lower end of the shaft has threaded thereon a clutch member 36, the upper end of which abuts against the inner ring of the ball bearing 33, the arrangement being one which permits free rotation of the shaft within the bored stem 17, and also permits free or independent rotation of the stem and the parts carried thereby.

Figure 4:
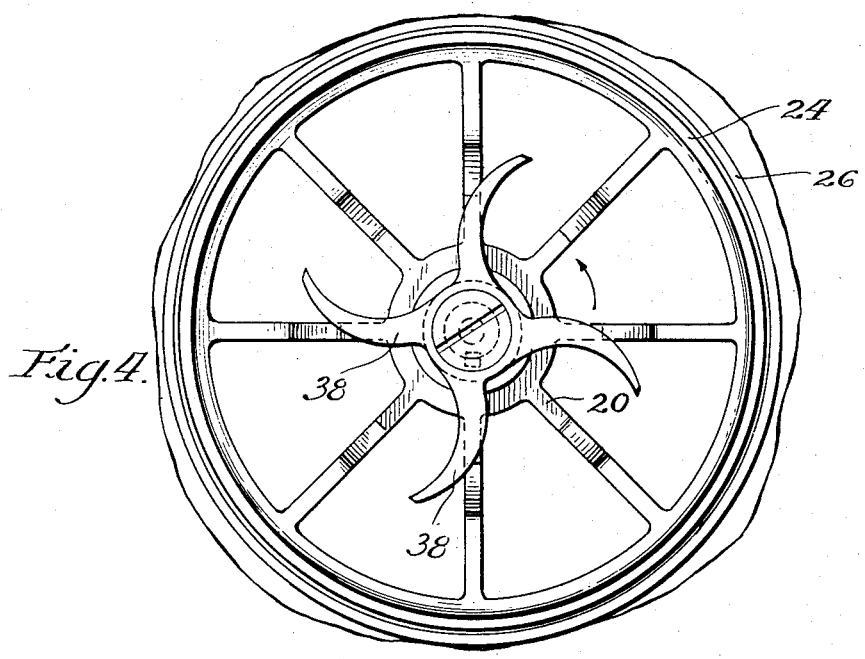
Fig. 4 is a plan view showing the arrangement of paddles and fins in the cup which contains the liquid under test.
Figure 5:
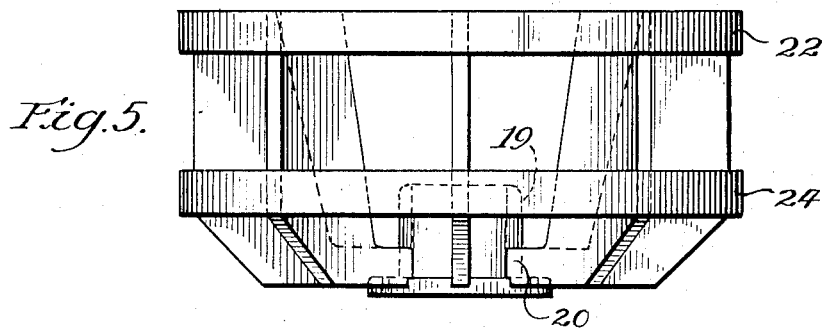
Fig. 5 is a side elevation of the same.
Figure 6:
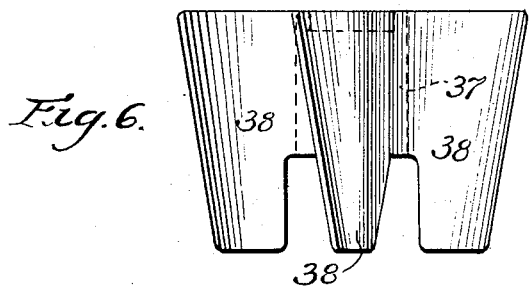
Fig. 6 is a detail of the paddle.

The shaft 34, as shown in Figs. 1 and 2, carries at its upper end a four bladed paddle comprising a hub 37, bored to receive the upper end of the shaft, from which hub radiates four blades 38. The formation of the blades is best indicated in Figs. 4 and 6, from which it will be observed that the blades all curve in the same direction, the blades being tapered inwardly and downwardly, and the blades being slightly offset from the vertical at their free edges.

The blades are of a width in the radial direction to bring their free edges into close proximity to the fins 21, so that, as the paddle rotates, the edges of the blades will slightly clear the edges of the fins at all points. The amount of this clearance can be regulated by the use of washers of varying thicknesses 39, the number of which may be varied to slightly raise or lower the paddle with relation to the shaft upon which it is mounted, and by thus adjusting the paddle, the clearance can be varied as desired. By having the washers graduated in thickness to represent standard units of viscosity, it is possible to accurately adjust the clearance to conform to the required conditions.

When properly adjusted, the paddle will be held in fixed relation on the shaft by provision of a headed clamping screw 40, which is threaded into the upper end of the shaft and turned down until its head abuts against a shoulder or recess 41 in the upper end of the hub 37. The blades extend below the hub, as indicated, to provide space for the mounting of the shims, which latter rest upon a collar 42 which surrounds the shaft and affords a bearing abutment against the upper end of the stem 17.

Figure 3:
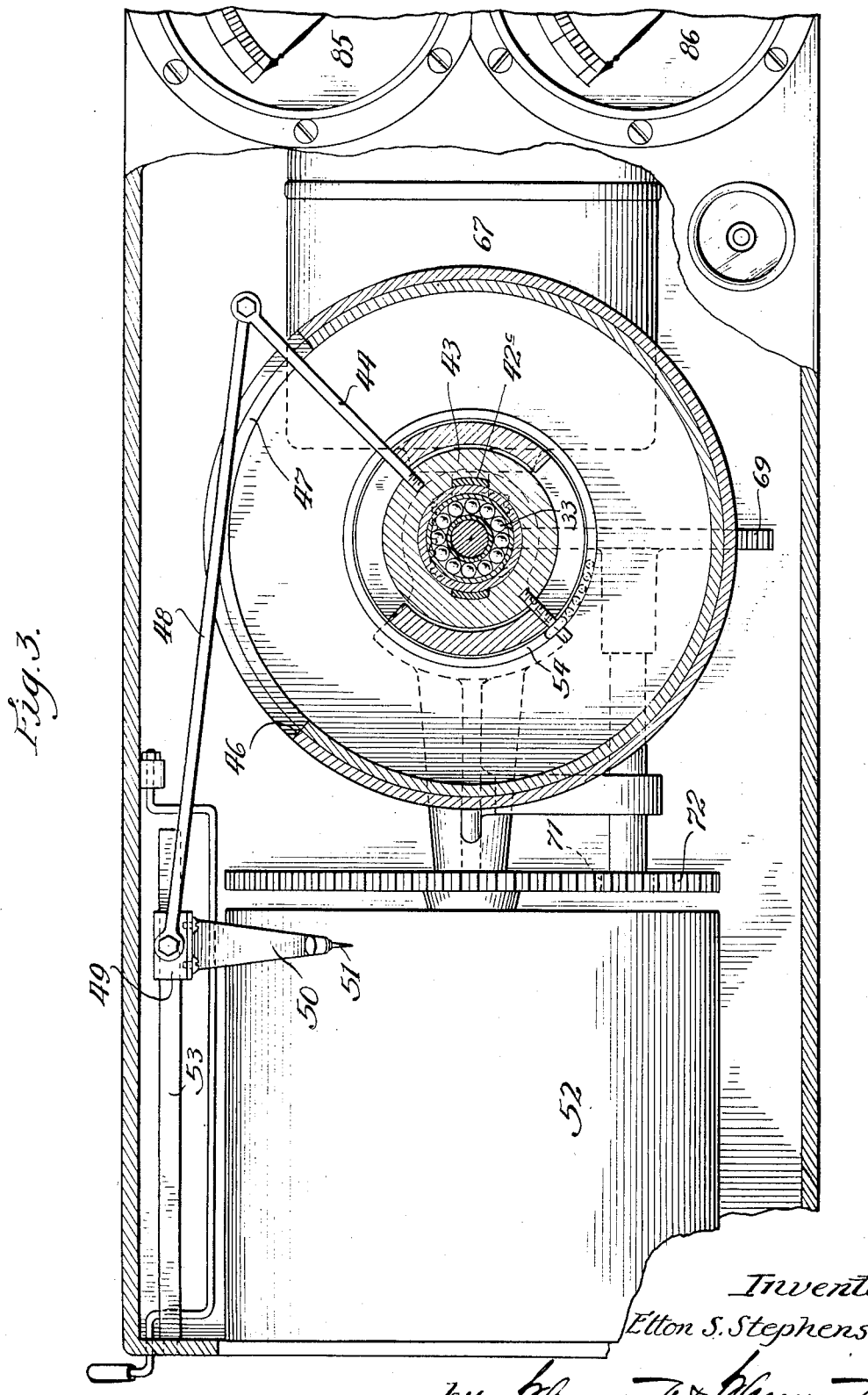
Fig. 3 is a sectional plan view of the device taken through line 3—3 of Fig. 2.

Surrounding the sleeve 16 is a closely fitting shell 42$^a$ provided at its lower end with depending fingers 42$^b$, extending below the end of the sleeve as shown in Fig. 2, which fingers engage notches 42$^c$ in a collar 43, as shown in Fig. 3. This constitutes an easy and convenient method of providing the fingers. The collar 43 affords a mounting for an arm 44, which is offset downwardly at the point 45 and extends outwardly through a slot 46 in a flanged circular cross plate 47, which fills the space within the base of the neck 12.

The outer end of the arm 44 has pivoted thereto a link 48 (see Fig. 3), which has its free end pivoted to a rider 49 carrying an arm 50 at the tip end of which is a stylus 51 adapted to inscribe a record line on the record sheet carried by a constantly rotating drum 52. The rider 29 is slidably mounted on a bracket bar 53 located at one side of the drum 52, the arrangement being such that as the stem 17 and arm 44 mounted thereon are rotated, the stylus will be moved to a degree commensurate with such rotation, and thereby inscribe a corresponding record line on the record carried by the cylinder.

The rotation of these parts is resisted by a coil spring 54 which surrounds a boss 55 in the center of the cross plate 47, and the lower convolution of the spring terminates in a hook 56 held in fixed relation within the plate 47, while the upper convolution of the spring terminates in an eye 57 which engages a pin 58 outstanding from the collar 43, from which the arm 44 projects. The arrangement is one which affords a limited degree of turning movement to the collar and arm 44 against the constantly increasing tension of the spring, so that the extent of the movement as recorded on the record sheet will indicate the force of the spring tension overcome and constitute a record of the consistency or viscosity of the liquid under test.

The shaft 34, as before stated, is provided at its lower end with a male clutch element 36 which engages with a female clutch element 59 which is carried at the upper end of a driving shaft 60, which latter terminates in the thrust bearing 35, previously referred to. The female clutch element 59 is threaded onto the reduced upper end of the shaft 60 and abuts against ball bearing members 61 carried within the head 62 of a bracket 63. The drive shaft 60 is provided with a worm gear 64 which meshes with a worm 65 mounted upon a power shaft 66 leading from a motor 67. The shaft 60 is also provided near its lower end with a worm 68 which drives a worm gear 69 mounted upon a shaft 70, which carries a small spur pinion 71 (see Fig. 2) meshing with a large gear 72 mounted upon the shaft 73 which carries the drum 52 upon which the record is inscribed.

In order to register the temperature of the oil or liquid under test, a thermometer 74 is provided which is entered through an aperture 75 in the cap plate 30 for the inner cup, and thence passes upwardly through an elongated circumferentially extending slot 76 in the cap plate 32 of the outer cup, which slot 76 is surrounded by an upstanding wall 77 which serves to protect the thermometer, and, at the same time, permits it to move through the range of movements afforded to the inner cup when the test is being conducted.

The upper cone bearing 27 is carried by a recessed stem 78 mounted within a tubular socket 79, entered through the boss 31, and closed by means of a block 80 which bears against a coil spring 81 which holds the cone bearing 27 in spring engagement with the conical recess 28 in the boss 29. An overflow pipe 82 is provided in the outer bowl 10 and a drain cock 83 located in the base of the bowl serves to permit drainage therefrom. The record drum 52 is located beneath a window 84 in the top of the box like housing 13, and an ammeter 85 and volt meter 86 serve to indicate the current and voltage delivered to the motor.

Figure 7:
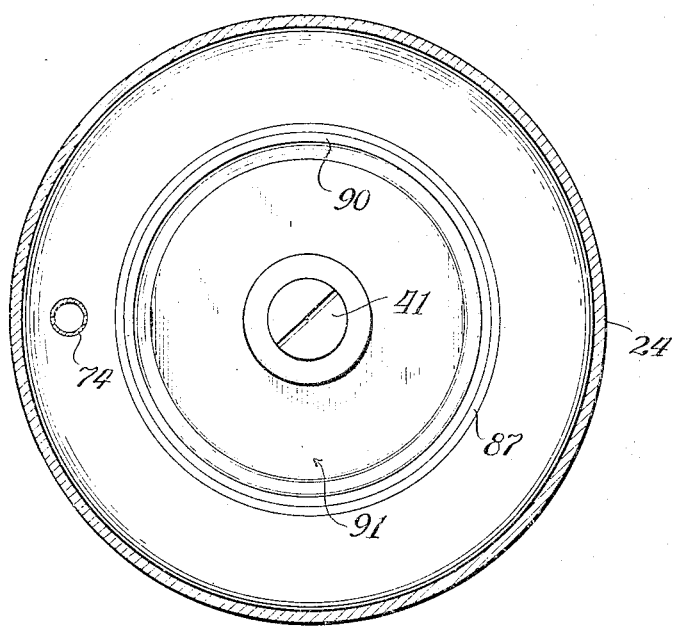
Fig. 7 is a plan view of a modified form of the liquid containing elements of the device.
Figure 8:
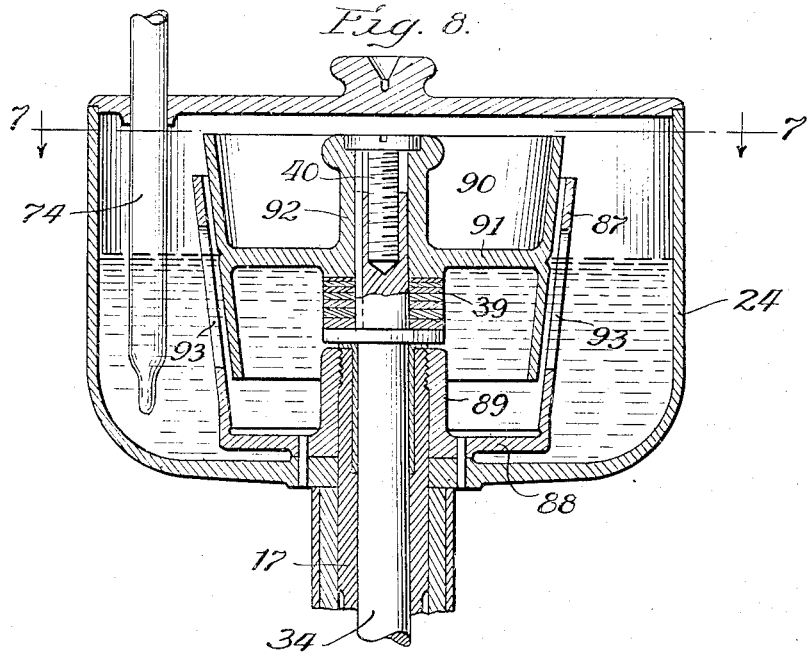
Fig. 8 is a sectional elevation of the same.

In lieu of the bowl and inner cup arrangement heretofore described, the devices illustrated in Figs. 7 and 8 may be substituted. In lieu of the cup 24 with the inwardly projecting fins, a tapered cup 87 is provided, the base 88 of which is provided with a boss 89, similar in configuration to the hub 19 previously described. In fact, the cup 87 is simply screwed into place on the upper end of the stem 17 in place of the hub and fin cage, heretofore described, and functions in lieu thereof.

In place of the threaded bowl, a downwardly depending drum 90 is provided, which drum on its interior is provided with a cross wall 91 which merges into a centrally disposed tubular hub 92 which is keyed on the upper end of the shaft 34 and held rigid thereon by the clamping screw 40 heretofore described. The vertical adjustment of the tapered drum can be regulated by means of the shims 39, and aside from the substitution of the cup and tapering drum, the construction is precisely similar to that heretofore described. The wall of the cup 87 is provided with a plurality of slots 93 which affords free communication between the interior of the inner cup and the outer cup 24.

In use, I will first describe the operation of the device illustrated in Figs. 1 to 6. The bowl is filled with cracked ice or other refrigerant, and thereafter the oil to be tested is poured into the inner cup 24 up to a definite level which is suitably marked on the cup or the fins associated therewith. Thereafter when the temperature, as observed on the thermometer, stands at the highest level to be embraced within the record, the motor is started and allowed to run for a short period of time, as, for instance, five seconds, and is then stopped until the temperature has fallen to the next lower level which it is desired to record. The motor is again operated for the same period of time, and therefore, at recurrent intervals, indicative of descending steps in the temperature scale, the motor is momentarily operated with a view of securing on the record drum a series of readings indicative of progressively descending temperatures, each operation of the device being made during the short interval of time that the temperature remains substantially constant at a given degree within an allowable range of error.

The starting of the motor causes a rotation of the vertical shaft with the paddle carried thereby, and this rotation of the paddle in the counterclockwise direction, indicated in Fig. 4, will cause the oil or other liquid under test to be driven into the pockets or bays intermediate the fins and to exert a rotative pressure against the fins which, at a given speed of rotation, will be inversely proportioned to the fluidity of the liquid. That is to say, when the liquid, at a given temperature, is in a thinner condition than is standard for such liquid at such temperature, the rotative effect will be less than standard, and this deficiency in rotative effect will be indicated on the record line inscribed by the stylus. If, on the contrary, the liquid has an excessively thick or heavy consistency at a given temperature, the rotative effect will be excessive, and this excess above standard will likewise be reflected on the record line.

As the temperature descends and the liquid progressively thickens, each subsequent operation of the motor will result in a correspondingly enhanced movement of the inscribing arm, with the result that after all of the desired temperatures have been recorded, a series of peaks in the record line will appear, and by inscribing a continuous line touching the summit of the peaks, a curve will be obtained indicative of the consistency of the liquid for comparison with a standard curve similarly secured.

The arrangement is one which is applicable to the testing of oils or other liquids within a wide range of temperatures, since the record will in each case bear a definite ratio to the thickness or density of the liquid which will progressively increase as the temperature is lowered. By adjusting the clearance between the edges of the paddle blades and the co-operative fins, the testing apparatus can be accurately adjusted to a proper point to produce a true curve on oil or liquid of standard consistency, for which comparative test may be made of the liquids requiring such tests.

In the device of Figs. 7 and 8, in lieu of the bladed paddle and inner cup, the slightly tapered drum and surrounding cup may be substituted, and in this case by reason of the small width of the clearance space between the constantly rotated drum and the cup, a body or film of oil will be maintained between the surface of the drum and cup. Through this body or film a drag or force will be transmitted to the spring back cup and a frictional effect will be developed which will be proportionate to the viscosity, or lubricating value of the oil or other liquid under test, and this friction will impart a rotative effect to the cup proportionate to the viscosiy of the liquid. The operation of the remaining parts, however, is exactly similar to that heretofore described, and further reference thereto is deemed unnecessary.

The arrangement as a whole is one which can very easily be assembled and disassembled for the purposes of packing, adjustment and otherwise. The exterior bowl can be readily slipped off from the shoulder seat upon which it is mounted, and the inner and outer cups can likewise be removed either individually or in conjunction, as occasion may require.

The inner cup and rotating members, together with the shaft 34, the stem 17, the sleeve 16, and the shell 42$^a$ can be removed as a unit. In removing the inner cup and associated parts, the fingers or prongs 42$^b$ will draw away freely from the notches in the collar 43, leaving the latter in place and in associated relation with the arm 44 and inscribing mechanism connected thereto. At the same time, the clutch elements 36 and 59 will disengage, so that the entire superstructure can be removed for storage, transportation or the like. After removing the inner cup and associated parts, the stem 17 can be unscrewed from the hub 19 by manipulation of the knurled end 33$^a$ of the stem, and in like manner, the bladed paddle or its substitute, the drum 90, can be removed from the upper end of the shaft by unscrewing the headed clamping screw 40 which holds these parts in place.

The arrangement as a whole is one which eliminates the necessity for the computation of results based upon the reading of a plurality of recording instruments and inscribes the ultimate record in permanent form and in a way which permits instant comparison to be made with previously inscribed records, so that accuracy and precision in the reading of the results is attained. The instrument is adapted to adequately record the consistency of liquids throughout a wide range of temperatures, and is highly superior in operation to instruments which require a reading of the motor load or the observance of data of similar character in order to compute the desired result.

Although the invention has been described with considerable detail, it is not the intention to limit the invention to the precise construction shown, since numerous variations can be employed without departing from the spirit of the invention.

I claim:

1. In a testing device of the character described, the combination of a cup shaped liquid container, a stem rigidly secured to said container and depending therefrom, a shaft entered through said stem and rotatable with respect thereto, a mounting for said stem to permit oscillation of said stem and liquid container, a plurality of fins in fixed relation to said container and inwardly extending from the wall thereof, a paddle mounted upon the upper end of the shaft and provided with blades having their edges in close relation to said fins for imparting a rotative impetus to the liquid under test, and spring means associated with the stem and opposing rotation thereof for indicating the degree of rotation imparted thereto through the action of the liquid under test, substantially as described.

2. In a testing device of the character described, the combination of an oscillatably mounted liquid container, means for resisting the oscillation thereof, a rotatable element within the container and concentrically mounted with respect to the axis of oscillation of the container, means for imparting rotation to the rotatable element, the rotatable element and the container being respectively provided with coacting portions of axially tapering formation and in closely adjacent relation to one another, a mounting for the rotatable element permitting adjustment thereof to vary the clearance between the co-acting portions of the rotatable element and the surrounding container, and means for indicating the extent of the oscillation imparted to the container by motion imparted to the liquid therein, substantially as described.

3. In a testing device of the character described, the combination of a cup shaped oscillatably mounted liquid container, means for resisting the oscillation thereof, a rotatable element within the container and concentrically mounted with respect to the axis of oscillation thereof, means for imparting rotation to the rotatable element, the peripheral portion of the rotatable element being of axially tapering formation and the container being provided with an axially tapering portion surrounding the peripheral portion of the rotatable element and in closely spaced relation thereto to provide a relatively slight clearance for the passage of the liquid under test between the two tapering elements, means for permitting adjustment of the degree of said clearance, and means for indicating the extent of the rotation imparted to the container by the motion of the liquid therein, substantially as described.

4. In a testing device of the character described, the combination of an oscillatably mounted cup shaped liquid container, means for resisting the oscillation thereof, a vertical shaft extending concentrically through the base of the liquid container, a rotatable element adjustably mounted upon the upper end of said shaft and having a downwardly axially tapering peripheral formation, a surrounding member carried by the container and having an axially tapering formation complementary to that of the rotatable element and in close relation to the same to restrict the clearance afforded for the passage of the liquid under test, means for rotating the shaft, and means for indicating the extent of the oscillation imparted to the container by the motion of the liquid therein, substantially as described.

5. In a testing device of the character described, the combination of a cup shaped liquid container, a shaft centrally entered through the base of the container, a mounting for the container surrounding the shaft and adapted to permit oscillation of the liquid container, a rotatable element removably and adjustably mounted on the upper end of the shaft and provided with an axially tapering peripheral formation configured to impart a rotative effect upon the liquid under test, a coacting member carried by the container and having an axially tapering configuration and in closely spaced relation to the rotatable member to restrict the passage of liquid, the rotatable element being adjustable to vary said clearance and removable to permit a substitution of a differently configured rotatable element, means for rotating the shaft, and spring means opposing rotation of the said container for indicating the extent of the oscillation imparted to the container by the motion of the liquid therein, substantially as described.

ELTON S. STEPHENS.